(12) United States Patent
Rosenberg et al.

(10) Patent No.: US 7,244,404 B2
(45) Date of Patent: Jul. 17, 2007

(54) PROCESS FOR THE REMOVAL OF OXALATE AND/OR SULPHATE FROM BAYER LIQUORS

(75) Inventors: Steven P. Rosenberg, Australind (AU); Wayne Tichbon, Eaton (AU); Darrel J. Wilson, Leschenault (AU); Catherine A. Heath, East Bunbury (AU)

(73) Assignee: Worsley Alumina Pty. Ltd., Collie, WA (AU)

( * ) Notice: Subject to any disclaimer, the term of this patent is extended or adjusted under 35 U.S.C. 154(b) by 502 days.

(21) Appl. No.: 10/798,333

(22) Filed: Mar. 12, 2004

(65) Prior Publication Data

US 2004/0170546 A1 Sep. 2, 2004

Related U.S. Application Data

(63) Continuation of application No. 09/936,781, filed on Sep. 18, 2001, now Pat. No. 6,743,403.

(51) Int. Cl.
C01F 7/00 (2006.01)
(52) U.S. Cl. .................. 423/121; 423/122; 423/124; 423/128; 423/129; 423/130
(58) Field of Classification Search ............... 423/121, 423/122, 124, 128, 129, 130
See application file for complete search history.

(56) References Cited

U.S. PATENT DOCUMENTS

| | | | |
|---|---|---|---|
| 3,899,571 A | 8/1975 | Yamada et al. | |
| 4,335,082 A | 6/1982 | Matyasi et al. | |
| 4,609,534 A | 9/1986 | The et al. | |
| 4,663,132 A | 5/1987 | Schmidt et al. | |
| 5,728,180 A | 3/1998 | Williams et al. | |
| 5,888,461 A | 3/1999 | Soirat | |
| 6,743,403 B1 * | 6/2004 | Rosenberg et al. | 423/122 |

FOREIGN PATENT DOCUMENTS

| | | |
|---|---|---|
| AU | 35943/89 A | 12/1989 |
| AU | 27000/92 A | 4/1993 |
| AU | 32197/93 A | 8/1993 |
| AU | 50778/93 A | 6/1994 |
| AU | 20347/95 A | 2/1996 |
| JP | 07033430 A | 2/1995 |
| JP | 09241019 A | 9/1997 |

* cited by examiner

*Primary Examiner*—Steven Bos
(74) *Attorney, Agent, or Firm*—Edell, Shapiro & Finnan, LLC

(57) ABSTRACT

A process for the removal and causticisation of sodium oxalate and/or sodium sulphate from a Bayer process liquor containing sodium carbonate and one or both of sodium oxalate and sodium sulphate in an alumina refinery is described. The process is based on the observation that to efficiently causticise sodium oxalate solutions, it is first necessary to remove the aluminate ion from solution, optionally with recovery of the aluminate ion in some later step. This is effected by removing aluminate ions from the Bayer liquor through the formation of a carbonate bearing hydrocalumite and/or sulpha-bearing hydrocalumite. The liquor may then be treated with sufficient lime to remove and causticise any residual carbonate ions and some or all of the oxalate ions present so that any reacted lime solids thus formed can be separated and safely disposed of. The process may include a pre-causticisation step in which the Bayer liquor is first causticised to reduce the concentration of carbonate ions, prior to the step of removing aluminate ions. The invention provides an effective process for the removal of sodium sulphate and a practical method for the recovery of soda from sodium sulphate. The efficiency of lime utilisation can also be dramatically increased from about 20% to 80% (if sulphate removal is not the objective) wherein alumina losses can be minimised. The oxalate concentration of the process liquor is also substantially lower than can usually be achieved in processes based on sodium oxalate-crystallisation.

34 Claims, 1 Drawing Sheet

PROCESS FOR THE REMOVAL OF OXALATE AND/OR SULPHATE FROM BAYER LIQUORS

CROSS REFERENCE TO RELATED APPLICATIONS

This application is a continuation of U.S. patent application Ser. No. 09/936,781, entitled "Process for the Removal of Oxalate and/or Sulphate from Bayer Liquors", and filed Sep. 18, 2001 now U.S. Pat. No. 6,743,403. The disclosure of this patent application is incorporated herein by reference in its entirety.

FIELD OF THE INVENTION

The present invention relates to a process and apparatus for the removal and causticisation of sodium oxalate and/or sodium sulphate from a Bayer process liquor.

BACKGROUND TO THE INVENTION

In the Bayer process for the production of alumina, bauxite is digested in a caustic liquor, generally under conditions of elevated temperature and pressure. A variety of organic and inorganic impurities are invariably extracted at the same time, reacting with caustic soda to form their sodium salts. In addition, some of the organic compounds can undergo degradation, ultimately producing sodium carbonate and the sodium salts of a range of simple carboxylic acids. The formation of these impurities represents a major loss of caustic from the refinery's liquor streams. This caustic must either be replaced, or recovered in some way from the impurities.

The recovery of caustic from sodium carbonate is a commonplace activity in most alumina refineries. The causticisation of sodium carbonate is generally effected by the addition of lime, which reacts with the sodium carbonate to form calcium carbonate, thereby liberating sodium hydroxide. An improved version of this process is described in our co-pending International Application No. PCT/AU99/00757, filed on the 25 Sep. 1999 and entitled "Improved Bayer Causticisation". The contents of PCT/AU99/00757 are incorporated herein by reference.

Of the other impurities, sodium oxalate and sodium sulphate are among the most significant. The presence of sodium oxalate in Bayer process streams is problematical owing to its very limited solubility. This creates a number of well-known problems within the alumina refinery. Sodium sulphate is much more soluble, and can accumulate to very high concentrations. This causes a different set of problems, particularly with respect to the refinery's productivity. The problems associated with this impurity in Bayer process liquors, and a process for its separation, have been described in Australian patent No. 673306.

Many prior art processes have been described for the removal of sodium oxalate and sodium sulphate from Bayer liquors. Some of these processes remove both impurities concurrently. In most cases, these processes advocate that the impurity is discarded after removal from the liquor stream. However, a small number of the above processes also provide a means for the recovery of soda from sodium oxalate. None describe a practical method for the recovery of soda from sodium sulphate, requiring that it be discarded. However, disposal of sodium sulphate is not straightforward.

Environmental considerations preclude disposal of sodium sulphate into natural water systems, and since it is highly soluble, it must be disposed in a suitably lined or otherwise isolated sanitary landfill if it is not to enter groundwater systems. In the alumina refinery, disposal of sodium sulphate to the red mud residue disposal areas results in the eventual return of most of the sodium sulphate to the process liquor stream with the recovered lake water.

Whilst it is preferable to utilise the sodium sulphate in some way, for example by conversion into useful products, options for this are extremely limited. Electrolytic cells are commercially available which convert sodium sulphate into sodium hydroxide and either sodium bisulphate or sulphuric acid. However, these are generally restricted to reasonably pure solutions in which scales are unlikely to form, because the membranes used in the cells are sensitive to fouling. Other processes have been investigated including reductive processes such as the Leblanc process, and the Peniakoff process for production of gibbsite from bauxite. These latter processes are not currently practised, as they are inefficient, costly and produce environmentally unacceptable by-products.

Thus, there is a significant need for an economic process for the processing of sodium sulphate into more useful products, and/or for the immobilisation of the sulphate anion in an environmentally acceptable, insoluble material.

Most alumina refineries practice some form of oxalate removal process. In general, these processes are based on variations of the following two procedures:

1. Sodium oxalate is permitted to coprecipitate with gibbsite in the refinery's gibbsite precipitation circuit. The co-crystallised oxalate reports to the refinery's gibbsite seed preparation facility, where it is removed by washing with water or dilute liquor. The oxalate-rich washings are then further treated to remove oxalate either by seeding and evaporation to recrystallise sodium oxalate or, by reaction with lime, as calcium oxalate.

2. Oxalate co-crystallisation is avoided by crystallising and removing sodium oxalate in a side-stream of one of the refinery's main process streams (usually a spent liquor stream). The side stream is evaporated to increase the supersaturation of the sodium oxalate and directed to a series of oxalate crystallisers where it is seeded with recycled sodium oxalate crystals. After solid/liquid separation, the clarified and now oxalate-depleted liquor is returned to the process. A portion of the solid sodium oxalate is recycled to act as seed, while the remainder is either discarded or processed to recover soda. An example of this process is outlined in U.S. Pat. No. 3,899,571.

Most processes for the recovery of the soda values from sodium oxalate are based on reactions with lime. In some processes, the separated sodium oxalate cake is first burnt in a kiln to produce sodium carbonate, which is subsequently causticised by reaction with lime. This process is costly to operate, and the conversion to sodium carbonate is not always complete.

In other processes, a solution rich in sodium oxalate, such as the washings from the seed circuit of a refinery that practices coprecipitation of oxalate, is directly reacted with lime to form calcium oxalate. However, whilst very low oxalate concentrations can be achieved in the treated stream in this way, the efficiency of lime utilisation is very poor, due to the formation of calcium aluminates such as tricalcium aluminate (TCA), unless the stream is very low in caustic and sodium aluminate. Consequently, this process can only be applied to dilute liquors.

SUMMARY OF THE INVENTION

The present invention was developed with a view to providing a means for the direct removal of sodium sulphate or sodium oxalate, or combinations of both, in Bayer process liquors with the production of sodium hydroxide. The unwanted anion is isolated in an insoluble solid material that can be disposed of in a conventional sanitary landfill, thus preventing the return of the unwanted anions to the refinery via the refinery's lake system.

Throughout this specification, we have used conventional North American terminology for the description of Bayer solution compositions. Thus, 'C' refers to the caustic concentration of the liquor, this being the sum of the sodium aluminate and sodium hydroxide content of the liquor expressed as equivalent g/L of sodium carbonate. 'S' refers to the sum of C and the true concentration of sodium carbonate. Thus, S-C gives the actual concentration of $Na_2CO_3$ in the liquor, in g/L. 'A' refers to the concentration of sodium aluminate in the liquor, expressed as equivalent g/L of $Al_2O_3$.

Sodium oxalate concentration is expressed as g/L of $Na_2C_2O_4$. Sodium sulphate concentration is expressed as g/L of $Na_2SO_4$. 'TS' refers to the sum of all sodium salts in solution, expressed as the equivalent concentration in g/L of sodium carbonate.

Lime refers either to calcium oxide, or more preferably, calcium hydroxide. Lime efficiency is defined as the percentage ratio of the number of moles of sodium hydroxide produced to the number of moles of lime consumed, divided by two.

The term Hydrocalumite is used to refer to any layered double hydroxide compound formed between calcium and aluminium, within which charge balancing anions are intercalated. Typically, these compounds will be of the form $[Ca_2Al(OH)_6]_2.X.nH_2O$, where 'X' represents a charge-balancing anion or anions.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

According to one aspect of the present invention there is provided a process for the removal and causticisation of sodium oxalate and/or sodium sulphate from a Bayer process liquor containing sodium carbonate and one or both of sodium oxalate and sodium sulphate in an alumina refinery, the process comprising the steps of:

removing aluminate ions from the Bayer liquor through the formation of acarbonate-bearing hydrocalumite and/or sulphate-bearing hydrocalumite; and, treating the liquor with sufficient lime to remove and causticise any residual carbonate ions and some or all of the oxalate ions present whereby any reacted lime solids thus formed can be separated and safely disposed of.

Preferably the process comprises a further step, prior to said step of removing aluminate ions, in which the liquor is enriched with sulphate and/or oxalate such that any aluminate and/or carbonate ions entering with the sulphate and/or oxalate are also removed.

Preferably the process comprises a further step, following said step of removing aluminate ions, of separating the carbonate-bearing hydrocalumite and/or sulphate-bearing hydrocalumite from the Bayer liquor to form a clarified liquor.

In another embodiment the process further comprises a pre-causticisation step in which the Bayer liquor is first causticised to reduce the concentration of carbonate ions, prior to said step of removing aluminate ions. Typically said pre-causticisation step includes heating the liquor, adding sufficient lime to react with the carbonate ions to produce calcium carbonate and separating the calcium carbonate from the liquor. Optionally the heated liquor is enriched with sulphate and/or oxalate prior to causticisation to ensure that any carbonate ions entering with the sulphate and/or oxalate are also causticised.

According to another aspect of the present invention there is provided an apparatus for the removal and causticisation of sodium oxalate and/or sodium sulphate from a Bayer process liquor containing sodium carbonate and one or both of sodium oxalate and sodium sulphate in an alumina refinery, the apparatus comprising:

means for removing aluminate ions from the Bayer liquor through the formation of a carbonate-bearing hydrocalumite and/or sulphate-bearing hydrocalumite; and, means for treating the liquor with sufficient lime to remove and causticise any residual carbonate ions and some or all of the oxalate ions present whereby any reacted lime solids thus formed can be separated and safely disposed of.

In one embodiment said means for removing aluminate ions comprises a first reaction vessel to which sufficient lime is added to react with all of the aluminate ions in the liquor. Preferably the apparatus of this embodiment further comprises a means for separating the carbonate-bearing hydrocalumite and/or sulphate-bearing hydrocalumite from the liquor to form a clarified liquor. Preferably the means for treating the liquor comprise a second reaction vessel to which sufficient lime is added to react with the sodium oxalate in the clarified liquor to form calcium oxalate and with any remaining carbonate ions to form sodium carbonate.

In another embodiment said means for removing aluminate ions and said means for treating the liquor are comprised in a single reaction vessel to which sufficient lime is added to react with the aluminate ions to form said carbonate-bearing and/or sulphate-bearing hydrocalumite, together with sufficient additional lime to react with the sodium oxalate to form calcium oxalate.

The inventors' theories on the chemical reactions in the process and apparatus of the present invention are merely examples of possible reactions thought to be taking place and are not intended to be limiting in any way.

BRIEF DESCRIPTION OF DRAWINGS

In order to facilitate a better understanding of the nature of the invention preferred embodiments of the process and apparatus for the removal and causticisation of sodium oxalate and/or sodium sulphate will now be described in detail, by way of example only, with reference to the accompanying drawings in which.

DETAILED DESCRIPTION OF PREFERRED EMBODIMENTS

Figure 1:
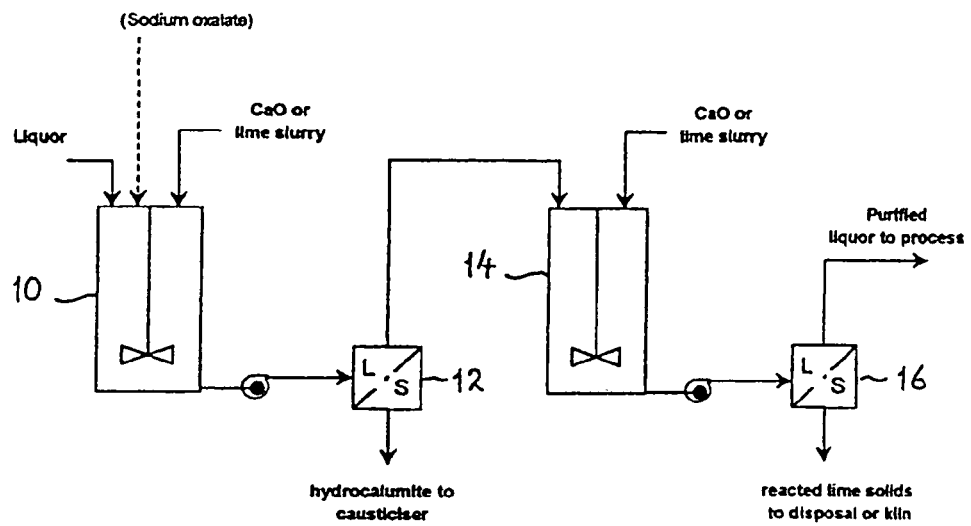
FIG. 1 is a simplified process flow diagram for the causticisation of sodium oxalate in accordance with one embodiment of the present invention; and, FIG. 2 is a simplified process flow diagram for the causticisation and removal of sodium sulphate and sodium oxalate in accordance with another embodiment of the present invention.

This invention is based upon the following two key findings:
1. The inventors have found that lime will not react with sodium oxalate to form calcium oxalate and sodium hydroxide in Bayer process liquors unless the concentration of sodium aluminate is close to zero.
2. It is known that hydrocalumite-type structures are formed by the reaction of lime with sodium aluminate solutions such as Bayer liquors, and that these structures will incorporate anions into the interlayer regions. The order of preference by which anions are incorporated is critical in the utilisation of this property. The inventors have found that the order of preference of anion incorporation in Bayer liquors is carbonate>sulphate>oxalate. This contrasts with published literature which indicates that the order is carbonate>oxalate>sulphate. ["Layered Double Hydroxides for Treatment of Bayer Process Lake Water" A J Perrotta, F S Williams and L C Stonehouse, Light Metals (1997), 37–48].

The above two findings explain why the conventional approaches to causticising sodium oxalate in Bayer process solutions are so inefficient with respect to lime use, and must be restricted to low S liquors. The addition of lime to these solutions results in the formation of hydrocalumite (Hc). Since carbonate is usually present in these liquors, the Hc formed is primarily the carbonate form:

$$4Ca(OH)_2 + 2Al(OH)_4^- + \frac{1}{2}CO_3^{2-} + nH_2O \leftrightarrow \quad (1)$$
$$[Ca_2Al(OH)_6]_2 \cdot OH - \frac{1}{2}CO_3 - nH_2O + 3OH^-$$

If sufficient lime has been added, this reaction will proceed until virtually all of the aluminate ion in solution has been removed, other than a small equilibrium concentration. Note that this is a very inefficient causticising reaction, in that eight moles of $Ca(OH)_2$ are required to causticise one mole of $Na_2CO_3$.

Rarely, insufficient carbonate may be present in the liquor to counterbalance all of the Hc.

In this case, if sulphate and/or oxalate are also present, sulphate is preferentially incorporated into the inter-layer regions of the hydrocalunite structure, as indicated by the following equation:

$$4Ca(OH)_2 + 2Al(OH)_4^- + SO_4^{2-} + nH_2O \leftrightarrows [Ca_2Al(OH)_6]_2SO_4 \cdot nH_2O + 4OH^- \quad (2)$$

If insufficient. sulphate is present to counterbalance all of the Hc formed, a small amount of oxalate can be incorporated into the Hc structure, as follows:

$$4CaOH)_2 + 2Al(OH)_4^- + C_2O_4^{2-} + nH_2O \leftrightarrows [Ca_2Al(OH)_6]_2C_2O_4 \cdot nH_2O + 4OH^- \quad (3)$$

Once the aluminate has been reduced to close to its equilibrium concentration in contact with Hc, the addition of further lime will result in the following reaction:

$$Ca(OH)_2 + C_2O_4^{2-} + H_2O \leftrightarrows CaC_2O_4 \cdot H_2O + 2OH^- \quad (4)$$

Reaction (4) is preferred over reaction (3), since only one mole of calcium hydroxide is required to causticise each mole of oxalate, and no alumina is consumed.

The reasons for the poor lime efficiency of conventional sodium oxalate causticisation processes should be apparent from the above explanation to those skilled in the arts of the Bayer process. Most of the lime is consumed forming Hc according to equation (1) above. When the dissolved alumina has been consumed, any additional lime will react with the oxalate and residual carbonate to form calcium oxalate and calcium carbonate respectively. Consequently, since most Bayer liquors contain substantial dissolved alumina, and the amount is usually proportional to the S concentration of the liquor, it is clear why the process is usually restricted to solutions of low S concentration.

From the preceding discussion, it is apparent that to efficiently causticise sodium oxalate solutions, it is first necessary to remove the aluminate ion from solution, preferably with recovery of the aluminate ion in some later step. In this invention, this removal is effected by reacting the aluminate with lime in such a manner that productive use is made of the hydrocalumite so formed. In its preferred form the process consists of the following basic steps:

1. Removal of carbonate ions from a Bayer liquor containing sodium carbonate and one or both of sodium oxalate and sodium sulphate, either through the formation of calcium carbonate using any suitable carbonate causticisation process known to those skilled in the arts of the Bayer process, or through the formation of carbonate-bearing hydrocalumite according to equation (1) above.
2. Separation and disposal of any calcium carbonate formed in Step (1) above, or separation and recovery of any carbonate-bearing hydrocalumite formed in Step (1). The recovered Hc may then be used for further causticisation, using the process described in co-pending International Application No. PCT/AU99/00757, thereby recovering the alumina consumed in Step (1).
3. Treatment of the clarified liquor produced in Step (2) with sufficient lime to remove any dissolved alumina remaining after Step (1), plus enough additional lime to react any remaining sodium carbonate and the sodium oxalate. This results in the following sequence of reactions:
    the removal and causticisation of some or all of the residual carbonate as carbonate-bearing Hc according to equation (1);
    the removal and causticisation of some or all of the sodium sulphate as sulphate-bearing He according to equation (2), and;
    the removal and causticisation of sodium oxalate as predominantly calcium oxalate monohydrate according to equation (4). Some calcium carbonate may also form.
4. Separation and disposal of the reacted lime solids formed in Step (3), and return of the clarified caustic solution to a suitable location within the Refinery.

The process of the invention for the causticisation and removal of sodium oxalate and/or sodium sulphate is further described and illustrated in the following two examples. These examples are illustrative of a variety of possible implementations and are not to be construed as limiting the invention in any way.

EXAMPLE 1

In this example, oxalate is causticised to sodium hydroxide with high lime efficiency and with little loss of alumina. The process may be operated in either batch or continuous mode with suitable selection of equipment.

Referring to the simplified process flow diagram of FIG. 1, a Bayer process liquor of S concentration of between 0 and 250 g/L, preferably less than 150 g/L is directed into a reaction vessel 10 and maintained at a temperature of between 20 and 90° C., preferably between 50 and 70° C. The type of reactor is not critical, for example a CSTR may be used, provided that sufficient agitation is applied to ensure that all of the solids are adequately suspended. If the solution is not already enriched with oxalate, sodium oxalate in either solid form or as an aqueous solution may optionally be added, provided that the solubility of sodium oxalate is not exceeded after mixing with the liquor to be treated. A suitable stream for treatment would be the filtrate from the gibbsite seed washing facility in a refinery practising oxalate co-precipitation. Alternatively, a suitable stream could be prepared by dissolving oxalate cake in a dilute liquor such as the filtrate from the product washing filters.

Sufficient lime (preferably slaked lime) is added to the reaction vessel to react with substantially all of the dissolved alumina in the solution, forming a carbonate-bearing hydrocalumite. The lime requirement can be calculated using equation (1) above. The residence time in this reactor is not critical. The reaction is generally found to be complete in less than five minutes, but residence times of up to 2 hours have little or no adverse effect. The preferred residence time is 30 minutes. Excessive residence times may result in the undesirable formation of TCA, especially at high temperatures, causing a loss of efficiency.

The hydrocalumite solids and liquor are then separated using any suitable solid/liquid separation device 12 (preferably a pressure filter). The solids may then be used to causticise another liquor stream within the refinery, using the process revealed in co-pending International Application No. PCT/AU99/00757.

The clarified liquor is then directed to a second reaction vessel 14 and sufficient lime (preferably slaked lime) is added to react with the sodium oxalate to form calcium oxalate, and with any remaining sodium carbonate to form calcium carbonate. The amount of lime required may be calculated using equation (4) above, together with the following equation:

$$Ca(OH)_2 + CO_3^{2-} \rightleftharpoons CaCO_3 + 2OH^- \qquad (5)$$

This reaction should be conducted between 20 and 140° C., preferably between 50 and 80° C., with a reaction time of between 15 mins and 4 hours, preferably 60 minutes.

The resultant slurry is then forwarded to any suitable solid/liquid separation device 16, preferably a pressure filter. The solids may be discharged to the alumina refinery's red mud disposal area, or after washing and drying, calcined for re-use.

Laboratory Test Results

STAGE 1(a)—Removal of Aluminate Ions:

A calcium hydroxide slurry was prepared by slaking 31.3 g of freshly calcined LR grade CaO in 350 mL of deionised water. 860 mL of simulated seedwash filtrate liquor was transferred to a 2 liter stainless steel Parr autoclave and heated to 60° C. The temperature was maintained thermostatically. Agitation was applied using a pitched blade turbine impeller rotating at 200 rpm. When the temperature of the system had equilibrated, the slaked lime slurry was added quantitatively.

Samples of the liquors were collected from the reactor and filtered using 0.45 μm Acrodisc filters, at the commencement of the test and after 10 minutes of reaction.

After 10 minutes of reaction, the agitator was stopped, the slurry removed from the autoclave and filtered under vacuum through a Whatmans #1 filter. This step was performed rapidly to avoid carbonation of the liquor by reaction with carbon dioxide in the air.

STAGE 1(b)—Use of Hydrocalunite for Causticisation:

The hydrocalumite solids (341 g) collected by the filter were washed and air-dried. A sample of liquor was collected from the refinery mud washing circuit and filtered through a Whatman's #1 filter paper. 1000 mL of this liquor was placed in the autoclave and heated to 100° C. The temperature was maintained thermostatically. Agitation was applied using a pitched blade turbine impeller rotating at 200 rpm. When the temperature of the system had equilibrated, 80.4 g of the hydrocalumite solids was added quantitatively. The reaction was allowed to proceed for two hours with periodic sampling throughout.

STAGE 2—Oxalate Removal

A portion of the filtrate (670 mL) from Stage 1(a) was returned to the autoclave and equilibrated at a temperature of 60° C. The agitator was restarted and operated at 200 rpm. Calcium hydroxide slurry, prepared by slaking 6.2 g of freshly calcined LR grade CaO in 70 mL of deionised water, was then quantitatively added to the reactor.

Samples of the liquors were collected from the reactor and filtered using 0.45 μm Acrodisc filters, just prior to addition of the lime slurry and after 30 minutes of reaction. At 30 minutes, the agitator was stopped, the slurry removed from the autoclave and filtered under vacuum through a Whatmans #1 filter paper. As before, this step was performed rapidly to avoid carbonation of the liquor by carbon dioxide in air.

Comparison with Prior Art

To compare the efficiency of the proposed process with the prior art processes, a sample of the preceding liquor was reacted in a single stage-process with slaked lime.

A sample of the simulated seed-wash filtrate liquor above (900 mL) was transferred to a 2 liter stainless steel Parr autoclave and heated to 60° C. Calcium hydroxide slurry was prepared by slaking 52.9 g of freshly calcined LR grade CaO in 550 mL of deionised water. The temperature was maintained thermostatically. Agitation was applied using a pitched blade turbine impeller rotating at 200 rpm. When the temperature of the system had equilibrated, the slaked lime slurry was added quantitatively.

Samples of the liquors were collected from the reactor and filtered using 0.45 μm Acrodisc filters, at the commencement of the test and after 30 minutes of reaction.

After 30 minutes of reaction, the agitator was stopped, the slurry removed from the autoclave and filtered under vacuum through a Whatmans #1 filter. This step was performed rapidly to avoid carbonation of the liquor by reaction with carbon dioxide in the air.

Results:

TABLE 1

Liquor Analyses for Stage 1A of process.

| Sample | Liquor Volume | A (g/L) | C (g/L) | S (g/L) | A/C | C/S | $Na_2CO_3$ (g/L) | NaCl (g/L) | $Na_2SO_4$ (g/L) | $Na_2C_2O_4$ (g/L) | TS (g/L) |
|---|---|---|---|---|---|---|---|---|---|---|---|
| Seedwash filtrate (t = 0) | 860 mL | 19.8 | 55.6 | 66.4 | 0.356 | 0.837 | 10.8 | 5.4 | 15.1 | 8.8 | 89.8 |
| t = 10 mins | 1197 mL | 2.8 | 51.6 | 52.3 | 0.054 | 0.987 | 0.7 | 3.4 | 8.2 | 5.3 | 64.5 |

Analysis of the solids by XRD indicated predominantly carbonate-bearing hydrocalumite phases (major), some sulphate-bearing hydrocalumite (minor), a small amount of calcium oxalate (minor) and calcium carbonate (trace).

TABLE 2

Liquor Analyses for Stage 1B of process.

| Sample | Liquor Volume | A (g/L) | C (g/L) | S (g/L) | A/C | C/S | $Na_2CO_3$ (g/L) | NaCl (g/L) | $Na_2SO_4$ (g/L) | $Na_2C_2O_4$ (g/L) | TS (g/L) |
|---|---|---|---|---|---|---|---|---|---|---|---|
| Mud Washer overflow (t = 0) | 1000 mL | 66.5 | 103.9 | 126.7 | 0.640 | 0.820 | 22.8 | 9.0 | 24.2 | 1.8 | 174.3 |
| t = 120 mins | 1024 mL | 68.0 | 109.9 | 123.8 | 0.619 | 0.888 | 13.9 | 9.0 | 24.3 | 2.5 | 170.2 |

Analysis of the solids by XRD indicated predominantly calcium carbonate (major phase) with some carbonate-bearing hydrocalumite (trace).

As can be seen from the results in the above two tables, sodium carbonate has been efficiently removed and caustic generated. Small amounts of sodium sulphate and sodium oxalate have also been causticised.

Analysis of the solids by XRD indicated sulphate-bearing hydrocalumite (major), calcium oxalate (major) and unreacted lime (trace).

It can be seen from the above results that the concentration of oxalate and sulphate are greatly reduced. Small amounts of carbonate and other impurities have also been removed.

TABLE 3

Liquor Analyses for 2$^{nd}$ stage of process

| Sample | Liquor Volume | A (g/L) | C (g/L) | S (g/L) | A/C | C/S | $Na_2CO_3$ (g/L) | NaCl (g/L) | $Na_2SO_4$ (g/L) | $Na_2C_2O_4$ (g/L) | TS (g/L) |
|---|---|---|---|---|---|---|---|---|---|---|---|
| Seedwash filtrate (t = 0) | 670 mL | 3.1 | 51.6 | 52.4 | 0.060 | 0.985 | 0.8 | 3.4 | 8.3 | 5.2 | 65.6 |
| t = 30 mins | 753 mL | 0.3 | 51.3 | 51.8 | 0.006 | 0.990 | 0.5 | 2.6 | 4.5 | 1.5 | 58.4 |

Prior Art Process

TABLE 4

Liquor Analyses for Prior Art simulation.

| Sample | Liquor Volume | A (g/L) | C (g/L) | S (g/L) | A/C | C/S | Na$_2$CO$_3$ (g/L) | NaCl (g/L) | Na$_2$SO$_4$ (g/L) | Na$_2$C$_2$O$_4$ (g/L) | TS (g/L) |
|---|---|---|---|---|---|---|---|---|---|---|---|
| Seedwash filtrate (t = 0) | 900 ml | 20.0 | 55.2 | 66.1 | 0.362 | 0.835 | 10.9 | 4.9 | 14.9 | 10.10 | 89.1 |
| t = 30 mins | 1387 mL | 0.2 | 51.8 | 52.4 | 0.004 | 0.989 | 0.6 | 2.8 | 5.1 | 0.9 | 57.8 |

Analysis of the solids by XRD indicated multiple hydrocalumite phases (due to the presence of several different counterbalancing ions), calcium oxalate (major) and some unreacted lime (trace).

Comparison of Example 1 with Prior Art

After due allowance for volumetric changes due to the input of water with slaked lime, evaporative losses and changes in liquor composition, the following performance results were obtained for Stages 1 and 2 of Example 1, and for the simulation of the Prior Art process.

TABLE 5

Comparison of Causticisation and Removal for Example 1 with Prior Art Process.

|  | Stage 1 t/t CaO | Stage 2 t/t CaO | Prior Art t/t CaO |
|---|---|---|---|
| Alumina loss (as Al$_2$O$_3$) | 0 | −0.298 | −0.335 |
| Sodium carbonate converted | −1.491 | −0.026 | −0.170 |
| Sodium sulphate converted | −0.003 | −0.351 | −0.120 |
| Sodium oxalate converted | 0 | −0.379 | −0.148 |
| Sodium chloride converted | 0 | −0.052 | −0.009 |
| Sodium hydroxide produced | 1.269 | 0.492 | 0.317 |
| Lime efficiency | 88.9% | 34.4% | 22.2% |

The average lime efficiency for Example 1 over both stages of the process was 77.9%.

It can be seen from the above results that the proposed process is considerably more efficient in terms of its lime utilisation, and that far greater removal of both oxalate and sulphate is effected per tonne of lime. Furthermore, it should be noted that the mass of alumina lost per tonne of sodium oxalate removed is reduced by a factor of three.

EXAMPLE 2

In this example, sodium carbonate, sodium sulphate and sodium oxalate may all be causticised and removed from solution. In essence, the process sacrifices dissolved alumina for the recovery of the soda values of the sodium sulphate. Consequently, loss of alumina is of the same magnitude as would have occurred in the prior art oxalate causticisation processes, but with far greater recovery of caustic soda. While recovery of the alumina is feasible, it cannot be done without attendant release of the sulphate, and is hence not discussed here.

Figure 2:
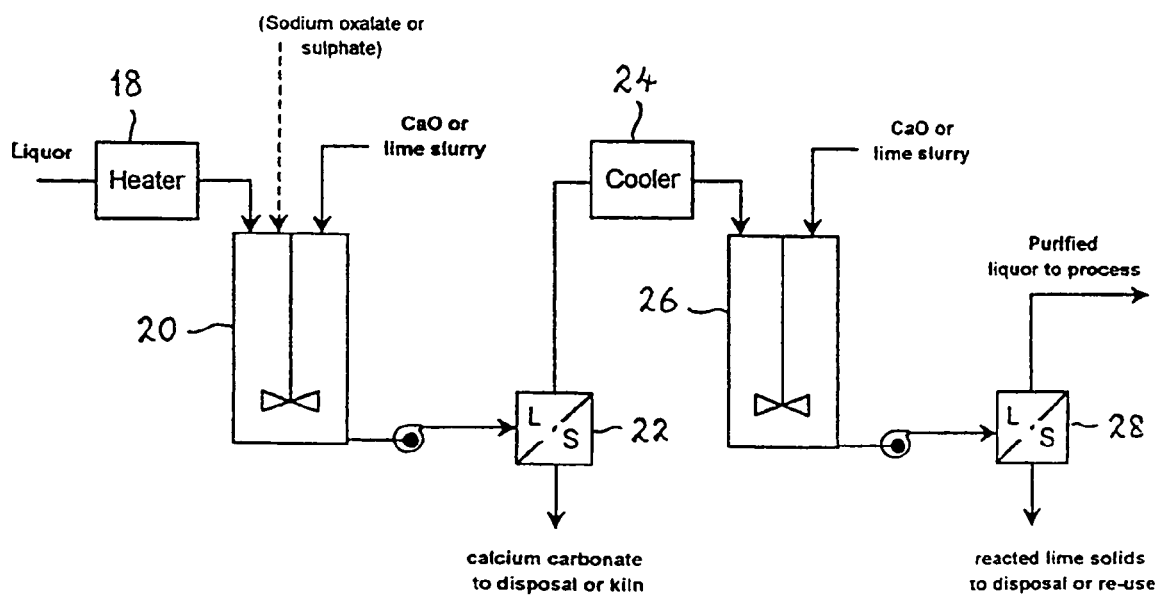

The principles of this variant of the process are best described by reference to the simplified flow diagram shown in FIG. 2. The process may be operated in either batch or continuous mode with suitable selection of equipment.

A Bayer process liquor of S concentration of between 0 and 250 g/L, preferably less than 150 g/L is first causticised to reduce the carbonate concentration, using any suitable procedure known to those practised in the arts of the Bayer process. Preferably, the process disclosed in co-pending International Application No. PCT/AU99/00757 is used for this function, as this will ensure highest efficiency. In the example given here, the liquor is heated to close to the atmospheric boiling point of the liquor (approximately 100° C.) by passing it through a heat exchanger 18 and directed into a reaction vessel 20. The type of reactor is not critical. For example, a CSTR may be used, provided that sufficient agitation is applied to ensure that all of the solids are adequately suspended.

If the solution is not already enriched with sulphate and/or oxalate, these may be added into this tank. Sodium oxalate may be added in either solid form or as an aqueous solution, provided that the solubility of sodium oxalate is not exceeded. The sodium sulphate can be prepared using any of the techniques described earlier and added either in solid form or as an aqueous solution, once again ensuring that the solubility of anhydrous sodium sulphate is not exceeded. For example, a liquor stream fortified with sulphate suitable for treatment by this process is produced using the process described in Australian patent No. 673306.

While it is feasible to add these impurities into the second tank, or other suitable location, it is preferable if this is done in the first tank, or in the liquor stream prior to entering the first tank. This is to ensure that any sodium carbonate entering with the oxalate or sulphate is causticised, otherwise efficiency may be degraded.

Sufficient lime (preferably slaked lime) is added to the reaction vessel 20 to react with the sodium carbonate: the amount will depend upon the liquor composition and the causticisation technique employed. However, care should be taken to avoid overcharging of lime, as this will reduce the lime efficiency of the process. In the example given here, a residence time of approximately 1 hour was sufficient to ensure optimum causticisation.

The slurry is then discharged to a solid/liquid separation device 22, which may be of any suitable design (preferably a pressure filter). The solids, which will consist primarily of calcium carbonate, may be discarded. Alternatively the solids may be further washed to recover soda, and then calcined for re-use.

The clarified liquor is cooled to between 30 and 90° C., preferably between 50° C. and 70° C. in a heat exchanger 24 and directed to a second reaction vessel 26. The heat exchanger 24 may be located before solid liquid separation device 22 to make the operating conditions within the solid/liquid separation device less aggressive. This will allow for a greater selection of solid/liquid separation devices. Once the liquid is separated and cooled, sufficient lime (preferably slaked lime) is added to react with the alumina, forming hydrocalumite, together with sufficient additional lime to react with the sodium oxalate to form calcium oxalate. The Hc thus formed will consist of a mixture of both carbonate and sulphate-bearing species, depending upon the amount of residual carbonate remaining in the liquor. The carbonate-bearing species will form preferentially, according to equation (1), followed by the sulphate-bearing species according to equation (2).

Thus, the ability of this process to causticise sodium sulphate will depend strongly on the efficiency of the pre-causticisation step in Tank 20, as well as the dissolved alumina content of the liquor, assuming that sodium sulphate is present in excess. Sodium oxalate will be causticised according to equation (4). The lime charge required can therefore be calculated on the basis of the liquor composition and the above three equations. To ensure efficient removal of the sodium oxalate, a slight excess of lime above the calculated amount (approximately 10%) is advisable.

The residence time required in the reactor 26 is between 30 minutes and 4 hours, preferably approximately 2 hours. Shorter residence times may be used if oxalate removal is not of paramount importance—in this case, the lime charge may be decreased accordingly.

The discharge from the tank 26 is pumped to a solid/liquid separation unit 28 such as a filter, centrifuge, or gravity separation device. The solids may then be disposed directly, or further washed and filtered before disposal. The washings can be returned to the second reactor, or mixed with the clarified liquor.

The clarified liquor, which will consist primarily of sodium hydroxide, may be returned to a suitable location within the refinery.

Laboratory Test Results

Stage 1:

A calcium hydroxide slurry was prepared by slaking 5.65 g of freshly calcined LR grade CaO in 60 ml of deionised water. Refinery seed-wash filtrate liquor was collected and filtered through a Whatmans #1 filter paper. 1000 mL of this filtered liquor was transferred to a 2 liter stainless steel Parr autoclave and heated to 100° C. The temperature was maintained thermostatically. Agitation was applied using a pitched blade turbine impeller rotating at 200 rpm. When the temperature of the system had equilibrated, the slaked lime slurry was added quantitatively.

Samples of the liquor were collected from the reactor and filtered using 0.45 µm Acrodisc filters, at the commencement of the test and after 60 minutes of reaction.

After 60 minutes of reaction, the agitator was stopped, the slurry removed from the autoclave and filtered under vacuum through a Whatmans #1 filter. This step was performed rapidly to avoid carbonation of the liquor by reaction with carbon dioxide in the air. The results of analysis of the liquor following Stage 1 are given below in Table 6.

TABLE 6

Liquor Analyses for 1st stage of process.

| Sample | Liquor Volume | A (g/L) | C (g/L) | S (g/L) | A/C | C/S | $Na_2CO_3$ (g/L) | NaCl (g/L) | $Na_2SO_4$ (g/L) | $Na_2C_2O_4$ (g/L) | TS (g/L) |
|---|---|---|---|---|---|---|---|---|---|---|---|
| Seedwash filtrate (t = 0) | 1000 | 20.0 | 55.2 | 66.1 | 0.362 | 0.835 | 10.9 | 5.1 | 14.9 | 10.1 | 89.1 |
| t = 60 mins | 1053 | 18.8 | 61.2 | 63.7 | 0.307 | 0.961 | 2.5 | 4.9 | 14.1 | 9.4 | 84.6 |

Analysis of the solids by XRD indicated predominantly calcium carbonate (major phase) with some carbonate-bearing hydrocalumite (minor phase).

Stage 2:

The filtrate (860 mL) was returned to the autoclave and equilibrated at a temperature of 60° C. The agitator was restarted and operated at 200 rpm. A calcium hydroxide slurry prepared by slaking 44.2 g of freshly calcined LR grade CaO in 450 mL of deionised water was then quantitatively added to the reactor.

Samples of the liquors were collected from the reactor and filtered using 0.45 µm Acrodisc filters, just prior to addition of the lime slurry and after 2 hours of reaction. At two hours, the agitator was stopped, the slurry removed from the autoclave and filtered under vacuum through a Whatmans #1 filter paper. As before, this step was performed rapidly to avoid carbonation of the liquor by carbon dioxide in air. The results of analysis of the liquor following Stage 2 of the process are given in Table 7 below.

TABLE 7

Liquor Analyses for 2nd stage of process

| Sample | Liquor Volume | A (g/L) | C (g/L) | S (g/L) | A/C | C/S | $Na_2CO_3$ (g/L) | NaCl (g/L) | $Na_2SO_4$ (g/L) | $Na_2C_2O_4$ (g/L) | TS (g/L) |
|---|---|---|---|---|---|---|---|---|---|---|---|
| Seedwash filtrate (t = 0) | 860 | 19.5 | 63.5 | 65.9 | 0.306 | 0.933 | 2.4 | 4.9 | 15.0 | 10.0 | 89.0 |
| t = 60 mins | 1293 | 0.8 | 56.1 | 55.6 | 0.012 | 0.993 | 0.5 | 2.6 | 0.8 | 1.4 | 59.2 |

Analysis of the solids by XRD indicated multiple hydrocalumite phases (due to the presence of several different counterbalancing anions) as the major component, calcium oxalate (major phase) and unreacted lime (trace).

It can be seen from the above results that the concentrations of carbonate, oxalate and sulphate are greatly reduced, and that the C/S ratio has increased. Some reduction in sodium chloride concentration has also occurred, although the reduction is minor. Similarly, a mass balance over soda indicates that small quantities of impurities other than those analysed here have also been causticised and removed.

After due allowance for volumetric changes due to the input of water with slaked lime, evaporative losses and changes in liquor composition, the following performance results were calculated per tonne of CaO consumed:

TABLE 8

Causticisation and Removal Performance for Example 2 compared with Prior Art Process

|  | Example 2 t/t CaO | Prior Art t/t CaO |
| --- | --- | --- |
| Alumina loss (as $Al_2O_3$) | −0.326 | −0.335 |
| Sodium carbonate converted | −0.167 | −0.170 |
| Sodium sulphate converted | −0.244 | −0.120 |
| Sodium oxalate converted | −0.142 | −0.148 |
| Sodium chloride converted | −0.016 | −0.009 |
| Sodium hydroxide produced | 0.394 | 0.317 |
| Total lime efficiency | 27.6% | 22.2% |

From the above description of several preferred embodiments and illustrative examples, it will be apparent that the process and apparatus for removal and causticisation of sodium oxalate and/or sodium sulphate has a number of advantages, including the following:

(i) it provides an effective process for the removal of sodium sulphate;

(ii) for the first time it provides a practical method for the recovery of soda from sodium sulphate;

(iii) the efficiency of lime utilisation can be dramatically increased from about 20% to 80% (if sulphate removal is not the objective);

(iv) the oxalate concentration of the processed liquor is substantially lower than can usually be achieved in processes based on sodium oxalate crystallisation;

(v) the efficiency of lime utilisation is greater than prior art processes based on reactions of lime with oxalate-rich Bayer liquors;

(vii) unlike oxalate removal processes based on sodium oxalate crystallisation, the process is not appreciably affected by the presence of organic poisons. This obviates the need for special organic poison removal processes, and contributes to consistent oxalate removal;

(viii) the process does not require the recycling of seed crystals and the associated equipment to achieve this;

(ix) the process does not require the use of strong liquors, raw caustic solutions or evaporation to supersaturate sodium oxalate. This simplifies oxalate removal and contributes to improved consistency of oxalate removal;

(x) unlike many prior art oxalate removal processes based on sodium oxalate crystallisation, the precipitated solids are consistent in their filtration and deliquoring characteristics, despite quite wide variations in solution composition. Liquor throughput and residual cake moisture can both be optimised; and, (xi) the process provides supplementary causticisation capacity, raising the C/S of the refinery's liquors.

Numerous variations and modifications to the process and apparatus will suggest themselves to persons skilled in the Bayer process arts in Alumina refineries, in addition to those already described, without departing from the basic inventive concepts. All such variations and modifications are to be considered within the scope of the present invention, the nature of which is to be determined from the foregoing description and the appended claims.

The invention claimed is:

1. A process for the removal and causticisation of sodium oxalate and/or sodium sulphate from a Bayer process liquor containing carbonate ions and oxalate and/or sulphate ions, the process comprising the steps of:
   (a) treating the Bayer process liquor to remove carbonate ions by forming carbonate-bearing solids;
   (b) separating the carbonate-bearing solids to form a clarified liquor containing residual carbonate ions and oxalate and/or sulphate ions;
   (c) adding lime to the clarified liquor to remove the residual carbonate ions and form reacted lime solids including the oxalate and/or sulphate ions; and,
   (d) separating the reacted lime solids to form a purified liquor.

2. A process as defined in claim 1 wherein the carbonate-bearing solids include carbonate-bearing hydrocalumite and, after step (b), the process comprises a further step of recovering the separated carbonate-bearing hydrocalumite.

3. A process as defined in claim 1, wherein step (a) further comprises the step of adding lime.

4. A process as defined in claim 1, further comprising the step of enriching the Bayer process liquor with sulphate ions and/or oxalate ions.

5. A process as defined in claim 4, wherein the step of enriching is conducted prior to and/or during step (a).

6. A process as defined in claim 4, wherein the step of enriching is conducted prior to and/or during step (c).

7. A process as defined in claim 1, wherein the Bayer process liquor has an S concentration prior to step (a) of between 0 and 250 g/L.

8. A process as defined in claim 7, wherein the S concentration is less than 150 g/L.

9. A process as defined in claim 1, further comprising the step of maintaining the temperature of the Bayer process liquor in step (a) between 20° C. and 180° C.

10. A process as defined in claim 9, wherein the temperature of the Bayer process liquor in step (a) is maintained between 20° C. and the atmospheric boiling point of the Bayer liquor.

11. A process as defined in claim 10, wherein the temperature of the Bayer process liquor in step (a) is maintained between 20° C. and 90° C.

12. A process as defined in claim 11, wherein the temperature of the Bayer process liquor in step (a) is maintained between 50° C. and 70° C.

13. A process as defined in claim 1, wherein step (c) is conducted at a temperature between 20° C. and 140° C.

14. A process as defined in claim 13, wherein step (c) is conducted at a temperature between 50° C. and 80° C.

15. A process as defined in claim 1, wherein step (c) is conducted over a residence time of between 15 minutes and 4 hours.

16. A process as defined in claim 15, wherein step (c) is conducted over a residence time of between 30 and 120 minutes.

17. A process as defined in claim 16, wherein step (c) is conducted over a residence time of between 30 and 60 minutes.

18. A process as defined in claim 1, further comprising the step of washing and drying the separated reacted lime solids.

19. A process as defined in claim 2, wherein the Bayer liquor includes sulphate ions and the separated reacted lime solids include sulphate-bearing hydrocalumite.

20. A process as defined in claim 19, further comprising the step of recovering the sulphate-bearing hydrocalumite after step (d).

21. A process as defined in claim 1, wherein the carbonate-bearing solids include calcium carbonate.

22. A process as defined in claim 9, further comprising the step of cooling the heated clarified liquor prior to step (c).

23. A process as defined in claim 22, wherein the step of cooling the heated clarified liquor is conducted after step (b).

24. A process as defined in claim 9, wherein the heated clarified liquor is cooled to a temperature between 30° C. and 90° C.

25. A process as defined in claim 22, wherein the heated clarified liquor is cooled to a temperature between 30° C. and 90° C. after step (b).

26. A process as defined in claim 24, wherein the heated clarified liquor is cooled to a temperature between 50° C. and 70° C.

27. A process as defined in claim 25, wherein the heated clarified liquor is cooled to a temperature between 50° C. and 70° C. after step (b).

28. A process as defined in claim 10, further comprising the step of cooling the heated clarified liquor prior to step (c).

29. A process as defined in claim 28, wherein the step of cooling the heated clarified liquor is conducted after step (b).

30. A process as defined in claim 10, wherein the heated clarified liquor is cooled to a temperature between 30° C. and 90° C.

31. A process as defined in claim 30, wherein the heated clarified liquor is cooled to a temperature between 30° C. and 90° C. after step (b).

32. A process as defined in claim 1, further comprising the step of agitating the Bayer liquor during step (a) and/or step (c).

33. A process as defined in claim 20, further comprising the step of recycling the recovered carbonate-bearing hydrocalumite and/or sulphate-bearing hydrocalumite within an alumina refinery.

34. A process as defined in claim 20, further comprising the step of recycling the recovered sulphate-bearing hydrocalumite to step (a).

* * * * *